United States Patent
Jasleen et al.

(10) Patent No.: US 11,528,265 B2
(45) Date of Patent: Dec. 13, 2022

(54) MULTI-FACTOR AUTHENTICATION METHODS AND RELATED SYSTEMS

(71) Applicant: DELL PRODUCTS L.P., Round Rock, TX (US)

(72) Inventors: Fnu Jasleen, Austin, TX (US); Joseph P. Marquardt, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 17/155,995

(22) Filed: Jan. 22, 2021

(65) Prior Publication Data

US 2022/0239639 A1 Jul. 28, 2022

(51) Int. Cl.
*H04L 29/06* (2006.01)
*H04L 9/40* (2022.01)

(52) U.S. Cl.
CPC ........ *H04L 63/083* (2013.01); *H04L 63/0876* (2013.01); *H04L 63/20* (2013.01); *H04L 2463/082* (2013.01)

(58) Field of Classification Search
CPC ... H04L 63/083; H04L 63/0876; H04L 63/20; H04L 2463/082
See application file for complete search history.

(56) References Cited

U.S. PATENT DOCUMENTS

| | | | |
|---|---|---|---|
| 10,372,575 | B1 | 8/2019 | North et al. |
| 10,499,540 | B2 | 12/2019 | North et al. |
| 2019/0332392 | A1* | 10/2019 | Pant ...................... H04L 9/3213 |
| 2019/0386981 | A1* | 12/2019 | Ramesh Kumar .... H04L 9/3228 |
| 2021/0034132 | A1 | 2/2021 | Hamlin |
| 2021/0034733 | A1 | 2/2021 | Grobelny |
| 2022/0131857 | A1* | 4/2022 | Nolte .................. H04L 63/0861 |

OTHER PUBLICATIONS

AuthO, "Make Multi-Factor Authentication Frictionless", Printed from Internet on Jan. 5, 2021, 7 pgs.
Futurae Technologies, Auth-api, "Authentication", Printed from Internet on Jan. 5, 2021, 5 pgs.
Honor Lock Proctoring, "Proctoring On-Demand", 2020, 6 pgs.
Futurae Technologies, "Futurae Docs", Printed from Internet on Jan. 5, 2021, 3 pgs.
Yamazaki et al., "Toward More Secure And Convenient User Authentication In Smart Device Era", IEICE Trans. Infomnation and System, vol. E100, No. 10, Oct. 2017, 8 pgs.
Duo, "Two-Factor Autehtnication (2FA) From Duo", Printed from Internet Jan. 5, 2021, 21 pgs.
Strom, "The Evolution Of MFA Security Tokens", Mar. 2015, 3 pgs.
George, "Rolling Codes And Encryption", HowStuffWorks, Captured from the Internet on Jan. 15, 2021, 2 pgs.

* cited by examiner

*Primary Examiner* — Baotran N To
(74) *Attorney, Agent, or Firm* — Egan, Enders & Huston LLP.

(57) ABSTRACT

The present disclosure provides various embodiments of systems and methods to securely authenticate a user. More specifically, the present disclosure provides embodiments of multi-factor authentication methods that improve both security and user convenience by using trusted secondary devices or peripherals (hereinafter "trusted devices") to provide additional authentication factor(s) for verifying user presence/identity after an initial authentication factor has been used to verify user presence/identity. Unlike conventional multi-factor authentication methods, the additional authentication factor(s) provided by the trusted devices do not require user input or intervention.

20 Claims, 5 Drawing Sheets

MULTI-FACTOR AUTHENTICATION METHODS AND RELATED SYSTEMS

FIELD

This invention relates generally to information handling system and network security, and more particularly, to user authentication methods that improve both security and user convenience.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the prevalence of information handling systems (IHSs) in today's society, and the increased connectivity between such systems, comes a need to enhance security within information handling systems and between network connected systems, devices, services and resources. Without having security measures in place, there exists a potential for a unauthorized user or system to gain access to an IHS, network resources or services connected to the IHS, or to an application, website or service used by the IHS.

Security services or programs are often provided within the operating system (OS) of an IHS to control access to computing resources, data and/or program code contained within the IHS. In general, OS level security services may grant access to computing resources, data and/or program code contained within an IHS based on authentication, identity and other security related context. Today, most security related context capture and authentication happens at machine boot or user login, and is not dynamic or continuous. This means that once an authorized user is permitted access to the IHS, the opportunities for an unauthorized user or system to gain access to the IHS, or to network resources or services, expand dramatically.

User authentication has traditionally involved the use of a username and password. More recently, however, additional authentication factors have been used and/or added to improve security. Each authentication factor covers a range of elements that may be used to authenticate or verify a user's identity. The three main authentication factors include: the knowledge factors (i.e., something the user knows, such as a username, password, personal identification number (PIN), challenge response, security question, etc.), the ownership factors (i.e., something the user has, such as a wrist band, ID card, security token or cell phone with a hardware/software token, etc.), and the inherence factors (i.e., something the user is or does, such as a fingerprint, retinal scan, facial recognition, voice signature or other biometric identifier). In some cases, location may be used as a fourth factor of authentication to verify the user's identity.

The reliability of authentication is affected not only by the number of authentication factors involved, but also the specific technologies and the manner in which they are implemented. For example, single-factor authentication methods that use only one authentication factor (such as username and password) provide the weakest level of authentication and are generally not recommended for systems, networks, applications or services that warrant a higher level of security. Multi-factor authentication methods that use two or more authentication factors are generally more secure, but require additional time and user input to complete authentication.

Some two-factor authentication methods combine a username and password with a challenge-response mechanism, such as a one-time passcode (e.g., nonce) that is sent to the user's computer or trusted device (e.g., cell phone) via SMS, email or push notifications. After the one-time passcode (i.e., the challenge) is received, the user must provide the correct passcode (i.e., the response) to the authentication application within a certain amount of time (e.g., within 60 seconds, or within 30 minutes) to authenticate or verify that the user is who he/she claims to be. Authentication applications (such as Guardian or DUO) are examples of other challenge-response mechanisms commonly used in multi-factor authentication methods. After providing a username and password, for example, the user may be challenged to approve (or deny) an authentication request via an authentication application provided on the user's trusted device. To complete authentication, the user must access the authentication application and approve the authentication request, again within a certain amount of time.

Current user authentication methods either provide ease of use at the detriment of security, or provide secure multi-factor authentication at the expense of user convenience. A need, therefore, exists for improved multi-factor authentication methods that improve both security and convenience.

SUMMARY OF THE INVENTION

The following description of various embodiments of systems and related methods is not to be construed in any way as limiting the subject matter of the appended claims.

To improve both security and convenience, the present disclosure provides various embodiments of improved systems and methods to securely authenticate a user. More specifically, the present disclosure provides various embodiments of improved systems and multi-factor authentication methods, which use trusted secondary devices or peripherals (i.e., "trusted devices") to provide additional authentication factor(s) for verifying user presence/identity after an initial authentication factor has been used to verify user presence/identity. Unlike conventional multi-factor authentication methods, the additional authentication factor(s) provided by the trusted devices do not require user input or intervention.

According to one embodiment, a system for securely authenticating a user in accordance with the present disclosure may generally include an information handling system (IHS) and at least one trusted device communicatively coupled to the IHS via a local network. The IHS may be coupled to receive user login information from the user when the user initiates login to a protected resource. The user login information may be used as an initial authentication factor to verify a presence or identity of the user. The at least one trusted device may include one or more sensors for obtaining sensor data. If the initial authentication factor successfully verifies the presence or identity of the user, the IHS may generate and communicate a challenge to the at least one trusted device, which may use the sensor data obtained by the one or more sensors to generate and communicate a response. Unlike in conventional systems, the challenge and the response communicated between the IHS and the at least one trusted device provide an additional authentication factor, which may be used to further verify the presence or identity of the user without user input or intervention.

In some embodiments, the at least one trusted device may include a plurality of trusted devices. In such embodiments, the challenge generated by the IHS may be communicated synchronously to each of the plurality of trusted devices, and the responses generated by the plurality of trusted devices may be communicated synchronously back to the IHS or to a cloud-based server.

In some embodiments, the challenge may include an authentication request to collect, access and/or use the sensor data obtained by the one or more sensors included within the at least one trusted device. Upon receiving the challenge from the IHS, the at least one trusted device may use the sensor data obtained from the one or more sensors included therein to generate and communicate the response to the authentication request. In some embodiments, the challenge may further include and/or be encrypted with a time-stamped cryptographic key.

The IHS may generally include a first set of program instructions, which are stored within a computer-readable medium and executed by a processing device of the IHS. If the initial authentication factor successfully verifies the presence or identity of the user, the first set of program instructions may be executed by the processing device of the IHS to: generate a timestamp token to capture a first timestamp of the time the user initiated login to the protected resource; store the timestamp token within the IHS; send the timestamp token to the at least one trusted device; and generate and communicate the challenge to the at least one trusted device, wherein the challenge includes a first timestamped cryptographic key, which is generated by the IHS using the timestamp token.

In some embodiments, the response generated by the at least one trusted device may be communicated back to the IHS for validation, decryption and authentication. In such embodiments, the first set of program instructions may be further executed by the processing device of the IHS to: validate the response received from the at least one trusted device, wherein the response includes a second timestamped cryptographic key, which is generated by the at least one trusted device using the timestamp token sent by the IHS to the at least one trusted device; decrypt the second timestamped cryptographic key using the timestamp token stored within the IHS to obtain a second timestamp; compare the second timestamp to the first timestamp; authenticate the user and log the user into the protected resource, if the second timestamp matches the first timestamp; and perform one or more security related actions, if the second timestamp does not match the first timestamp.

In some embodiments, the system may further include a cloud-based server, which is communicatively coupled to the IHS and the at least one trusted device via a wide area network, and the response generated by the at least one trusted device may be communicated back to the cloud-based server for validation, decryption and authentication. In such embodiments, the cloud-based server may include a second set of program instructions, which are stored within a computer-readable medium and executed by a processing device of the cloud-based server to: validate the response received from the at least one trusted device, wherein the response comprises a second timestamped cryptographic key, which is generated by the at least one trusted device using the timestamp token sent by the IHS to the at least one trusted device; decrypt the second timestamped cryptographic key using the timestamp token stored within the IHS to obtain a second timestamp; compare the second timestamp to the first timestamp; and authenticate the user only if the second timestamp matches the first timestamp. In some embodiments, the first set of program instructions may be further executed by the processing device of the IHS to: log the user into the protected resource, if the cloud-based server authenticates the user; and perform one or more security related actions, if the cloud-based server fails to authenticate the user.

A variety of computer-implemented methods are also provided herein for securely authenticate a user attempting to login to a protected resource. In some embodiments, the computer-implemented methods disclosed herein may be performed by execution of program instructions (i.e., computer program code) stored within an information handling system. In other embodiments, the computer-implemented methods disclosed herein may be performed by execution of program instructions stored within one or more trusted devices.

According to one embodiment, a computer implemented method is provided to securely authenticate a user attempting to login to a protected resource, wherein the computer implemented method is performed by an information handling system (IHS). The computer implemented method performed by the IHS may generally include: generating a challenge after an initial authentication factor has been used by the IHS to successfully verify a presence or identity of the user; communicating the challenge synchronously to each of a plurality of trusted devices communicatively coupled to the IHS; and receiving a response to the authentication request from each of the plurality of trusted devices. The challenge communicated to the plurality of trusted devices may include an authentication request to collect, access and/or use sensor data obtained by the plurality of trusted devices. Upon receiving the challenge, each trusted device may use sensor data obtained from one or more sensors included within the trusted device to generate the response. The challenge and the response provide an additional authentication factor, which may be used to further verify the presence or identity of the user. Unlike conventional user authentication methods, the challenge and the response disclosed herein are generated without user input or intervention.

In some embodiments, one or more additional steps may be performed after an initial authentication factor has been used by the IHS to successfully verify a presence or identity of the user and prior to generating the challenge. For example, the computer implemented method described herein may further include: generating a timestamp token to capture a timestamp of the user's login time; storing the timestamp token within the IHS; and sending the timestamp token to the plurality of trusted devices. In such embodiments, the response received from each trusted device may include, or be encrypted with, a timestamped cryptographic key that was generated by the trusted device using the timestamp token sent from the IHS to the trusted device.

In some embodiments, the computer implemented method may further include: validating the responses received from the plurality of trusted devices; decrypting the timestamped cryptographic key using the timestamp token stored within the IHS to obtain a timestamp; and comparing the timestamp obtained from the timestamped cryptographic key to the timestamp of the user's login time. In some cases, the computer implemented method may authenticate the user and log the user into the protected resource, if the timestamp obtained from the timestamped cryptographic key matches the timestamp of the user's login time. In other cases, the computer implemented method may perform one or more security actions, if the timestamp obtained from the timestamped cryptographic key does not match the timestamp of the user's login time. A variety of security actions may be performed if the timestamps do not match. Examples of security actions include, but are not limited to: preventing the user from logging in, asking the user to re-attempt login, and/or flagging the login attempt as abnormal user behavior or a security threat.

According to another embodiment, a computer implemented method is provided to securely authenticate a user attempting to login to a protected resource, wherein the computer implemented method is performed by at least one trusted device communicatively coupled to an information handling system (IHS). The computer implemented method performed by the at least one trusted device may generally include: receiving a timestamp token from the IHS after an initial authentication factor has been used by the IHS to successfully verify a presence or identity of the user, wherein the timestamp token comprises a timestamp of the user's login time; receiving a challenge from the IHS, wherein the challenge includes: (a) an authentication request to collect, access and/or use sensor data obtained by the at least one trusted device, and (b) a first timestamped cryptographic key that was generated by the IHS using the timestamp token; using the sensor data obtained by the at least one trusted device and the timestamp token received from the IHS to generate a second timestamped cryptographic key; and sending a response to the authentication request back to the IHS, wherein the response includes, or is encrypted with, the second timestamped cryptographic key.

Upon receiving the challenge from the IHS, the computer implemented method performed by the at least one trusted device may further include: decrypting the first timestamped cryptographic key using the timestamp token received from the IHS to obtain a timestamp; and comparing the timestamp obtained from the first timestamped cryptographic key to the timestamp included within the timestamp token.

In some embodiments, the computer implemented method may send the response to the authentication request back to the IHS only if the timestamp obtained from the first timestamped cryptographic key matches the timestamp included within the timestamp token. If the timestamp obtained from the first timestamped cryptographic key does not match the timestamp included within the timestamp token, the computer implemented method may further include: sending a timeout to the IHS, wherein the timeout causes the IHS to perform one or more security actions; or sending a message back to the IHS requesting another challenge be sent to the at least one trusted device. A variety of security actions may be performed by the IHS if the timestamps do not match. Examples of security actions include, but are not limited to: preventing the user from logging in, asking the user to re-attempt login, and/or flagging the login attempt as abnormal user behavior or a security threat.

BRIEF DESCRIPTION OF THE DRAWINGS

Other advantages of the present disclosure will become apparent upon reading the following detailed description and upon reference to the accompanying drawings in which.

Figure 1:
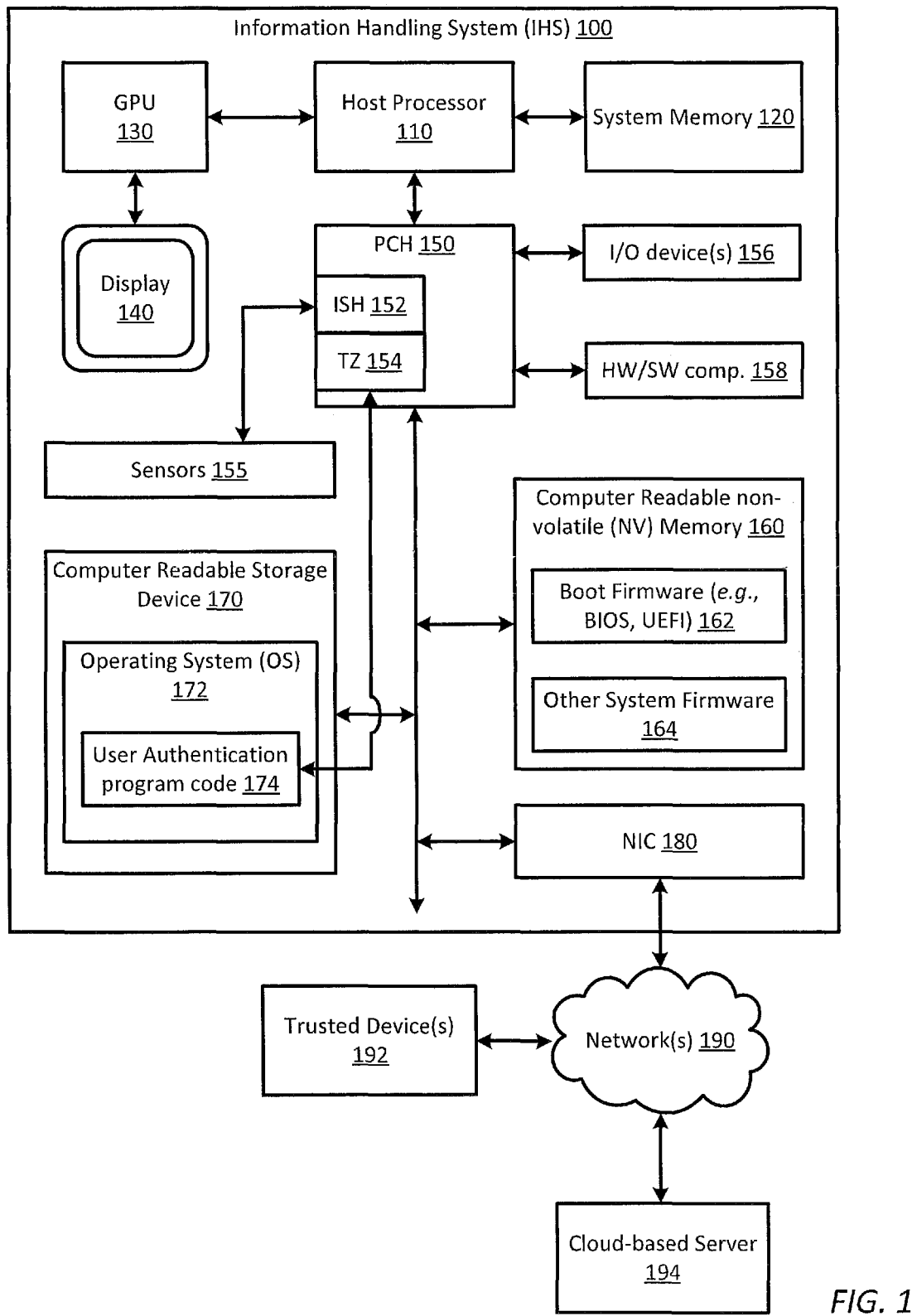
FIG. 1 is a block diagram illustrating one embodiment of an information handling system (IHS) that utilizes the multi-factor authentication techniques described herein.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

The present disclosure provides various embodiments of systems and methods to securely authenticate a user. More specifically, the present disclosure provides embodiments of multi-factor authentication methods that improve both security and user convenience by using trusted secondary devices or peripherals (hereinafter "trusted devices") to provide additional authentication factor(s) for verifying user presence/identity after an initial authentication factor has been used to verify user presence/identity. Unlike conventional multi-factor authentication methods, the additional authentication factor(s) provided by the trusted devices do not require user input or intervention.

In some embodiments, a user may initiate login to a protected resource (e.g., a protected system, network, website, application, etc.) by providing user login information to an information handling system (IHS), such as but not limited to, a desktop computer, a laptop computer, a tablet computer, a smart phone, etc. The user login information (e.g., a username and password, personal identification number (PIN), security token, security badge or wristband, biometric identifier, etc.) provides an initial authentication factor, which is used by the IHS to verify user presence/identity. If the initial authentication factor is successful, the multi-factor authentication method disclosed herein provides additional authentication factor(s) for verifying user presence/identity by synchronously communicating an automated challenge-response between the IHS and one or more trusted devices. A variety of trusted devices may be used to provide an automated response when challenged after an initial authentication factor has been used to verify user presence/identity. Examples of trusted devices include, but are not limited to, a tablet computer, a laptop computer, a security camera, a smart docking station, a smart phone, a smart watch, a smart home assistant (e.g., Amazon Alexa, Google Home, etc.), a smart monitor, a smart tv, and other "smart" devices.

In the embodiments disclosed herein, the IHS is a computer system or smart device from which the user initiates login to a protected resource, and the trusted device(s) are trusted secondary devices or peripherals located in close physical proximity to the IHS. For example, the IHS and trusted device(s) may be located within the same environment (such as the user's home or work environment), and may be communicatively coupled to a local network, such as a local area network (LAN) and/or personal area network (PAN). In some embodiments, the trusted device(s) may be separately authenticated to establish trust before user authentication begins.

As noted above, an automated challenge is synchronously communicated from the IHS to one or more trusted devices after a user initiates login at an IHS and an initial authentication factor is used to verify user presence/identity. As described in more detail below, the challenge communicated from the IHS to the trusted device(s) may include, and/or be encrypted with, a time-stamped cryptographic key. Upon receiving the challenge, the trusted device(s) may use one or more sensors included within the trusted device(s) to generate a response, which is communicated back to the IHS (or to a cloud-based authentication server) for validation, decryption and authentication. Like the challenge, the response communicated from the trusted device(s) to the IHS (or the cloud-based authentication server) may also include, and/or be encrypted with, a time-stamped cryptographic key.

The response(s) received from the trusted device(s) are validated, decrypted and compared by the IHS (or the cloud-based authentication server) to verify the presence and/or identity of the user attempting to login to the IHS. In some cases, the user may be authenticated and logged into the protected resource if the response(s) received from the trusted device(s) can be successfully used as an additional authentication factor (or factors) to verify user presence/identity. If the response(s) received from the trusted device(s) cannot be used to successfully verify user presence/identity, one or more security related actions may be performed. Examples of security actions include, but are not limited to, preventing the user from logging in, asking the user to re-attempt login, and flagging the login attempt as abnormal user behavior and/or a security threat. Other security actions may also be taken.

For example, the user may be allowed to login with limited access to certain resources or data, or the user's actions may be audited, if user presence/identity cannot be successfully verified. In other examples, other network paths could be determined from additional PAN devices and credentials validated through those network internet protocol paths. Still further, anti-hacker software traps could be set to allow the capture of false attempts to enter a protected system. Additionally or alternatively, user devices could be set to temporarily locked states until authenticated from a trusted root.

Turning now to the drawings, FIG. 1 is a block diagram of an information handling system 100 (e.g., a desktop computer, laptop computer, tablet computer, smart phone, etc.) as it may be configured according to one embodiment of the present disclosure. As shown in FIG. 1, IHS 100 may generally include at least one processing device (e.g., host processor) 110, a system memory 120, a graphics processor unit (GPU) 130, a display device 140, a platform controller hub (PCH) 150 having an integrated sensor hub (ISH) 152 and a trust zone (TZ) 154, a plurality of sensors 155 coupled to the ISH 152, one or more input/output (I/O) devices 156, additional hardware/software components 158, a computer readable non-volatile (NV) memory 160, a computer readable storage device 170, and a network interface controller (NIC) 180.

It is expressly noted that the IHS configuration shown in FIG. 1 is exemplary only, and that the methods disclosed herein may be implemented on any type and/or configuration of information handling system having one or more processing devices, a computer readable storage device, a plurality of sensors, a trust zone and a network interface controller. It will be further understood that while certain components of the information handling system are shown in FIG. 1 for illustrating embodiments of the present disclosure, the information handling system disclosed herein is not restricted to including only those components shown in FIG. 1 and described below.

Host processor 110 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 1, GPU 130 is coupled to display device 140 for providing visual images to the user. Although GPU 130 is shown as a separate processing device in the embodiment of FIG. 1, GPU 130 may be omitted in other embodiments, when the functionality provided thereby is integrated within host processor 110 in a system-on-chip (SoC) design. In some embodiments, IHS 100 may include other types of processing devices including, but not limited to, a graphics-derivative processor (such as a physics/gaming processor), a digital signal processor (DSP), and embedded controller, etc.

Platform controller hub (PCH) 150 is coupled to host processor 110 and configured to handle I/O operations for the IHS. As such, PCH 150 may include a variety of communication interfaces and ports for communicating with various system components, such as but not limited to, sensors 155, I/O devices 156, hardware/software components 158, computer readable NV memory 160, computer readable storage device 170, and NIC 180. PCH 150 may also include an integrated sensor hub (ISH) 152 and a trust zone (TZ) 154, as shown in FIG. 1.

Integrated sensor hub (ISH) 152 is a micro-processor capable of running specific functions, listening for specific sensor responses, and using artificial intelligence (AI)/machine learning (ML) based algorithms to detect events (such as, e.g., specific noises, etc.). As shown in FIG. 1, ISH 152 is coupled to receive sensor data from the sensors 155 included within the IHS 100. A variety of sensors 155 may be included, such as but not limited to, a camera, a motion sensor, an infrared (IR) sensor, a temperature sensor, an acoustic sensor, a microphone, a speaker, a vibration sensor, a proximity sensor, and other types of sensors. In some embodiments, the sensor data obtained from the sensors 155 may be used to detect user presence/identity. In other embodiments, the sensor data obtained from sensors 155 may include biometric data, which may be processed by the ISH 152 and used as user login information.

Trust zone 154 is a hardware component that provides a trusted execution environment for the IHS 100 by providing hardware and memory isolation of program instructions and data from the operating system (OS) 172. As described in more detail below, trust zone 154 includes a trust zone protected memory, which may be used to provide secure storage of security tokens and/or cryptographic keys. In some embodiments, trust zone 154 may store a timestamp token, which is generated by the trust zone to capture a timestamp of the login time, or the time at which the user initiated login to the protected resource. In addition to providing secure data storage, trust zone 154 also provides the cryptographic functionality needed to encrypt/decrypt cryptographic keys. In some embodiments, trust zone 154 may use the stored timestamp token to encrypt and/or decrypt a time-stamped cryptographic key, as described in more detail below.

I/O devices 156 enable the user to interact with IHS 100, and to interact with the software/firmware executing thereon. In some embodiments, one or more I/O devices 156 may be present within, or coupled to, IHS 100. In some embodiments, I/O device(s) 156 may be separate from the IHS and may interact with the IHS through a wired or wireless connection. Examples of I/O devices 156 include, but are not limited to, keyboards, keypads, touch screens, mice, scanning devices, voice or optical recognition devices, and any other devices suitable for entering or retrieving data. In some embodiments, a user of the IHS may utilize one or more of the I/O devices 156 to provide user login information (e.g., a username, password, PIN, passphrase, fingerprint, facial image, startup key, etc.) to the system.

In some embodiments, additional hardware/software components 158 may be included within IHS 100 to perform additional functions for the IHS. Example hardware/software components 158 include, but are not limited to, a Bluetooth controller, an audio controller, a Universal Serial Bus (USB) controller, a Global Positioning System (GPS) sensor, an accelerometer, a gyroscope, etc. In some embodiments, one or more of the hardware/software components 158 may be used by the multi-factor authentication method described herein to communicate with the trusted device(s) 192 or obtain additional sensor data that may be used to detect user presence/identity.

Computer readable memory 160 may include any type of non-volatile (NV) memory including, but not limited to, read-only memory (ROM), Flash memory (e.g., Serial Peripheral Interconnect, SPI, Flash memory) and non-volatile random-access memory (NVRAM), and may be generally configured to store software and/or firmware modules. The software and/or firmware modules stored within computer readable NV memory 160 may generally contain program instructions (or computer program code), which can be executed by host processor 110 (and/or other controllers included within the IHS) to instruct components of IHS 100 to perform various tasks and functions for the information handling system. As shown in FIG. 1, computer readable NV memory 160 may be generally configured to store boot firmware (FW) 162 and other system firmware 164. Boot firmware 162 may include software and/or firmware modules for specifying hardware configuration settings, system date/time, boot sequence, etc. In some embodiments, boot firmware 162 may be implemented as a Basic Input/Output System (BIOS) and/or a Unified Extensible Firmware Interface (UEFI).

Computer readable storage device 170 may be any type of persistent, non-transitory computer readable storage device, such as one or more hard disk drives (HDDs) or solid-state drives (SSDs). As shown in FIG. 1, computer readable storage device 170 may be generally configured to store an operating system (OS) 172, in addition to other software modules and data. OS 172 contains program instructions (or computer program code), which is executed by host processor 110 to perform various tasks and functions for the information handling system and/or for the user. Although not restricted to such, OS 172 may be one of the many Windows® operating systems provided by Microsoft.

Figure 4:
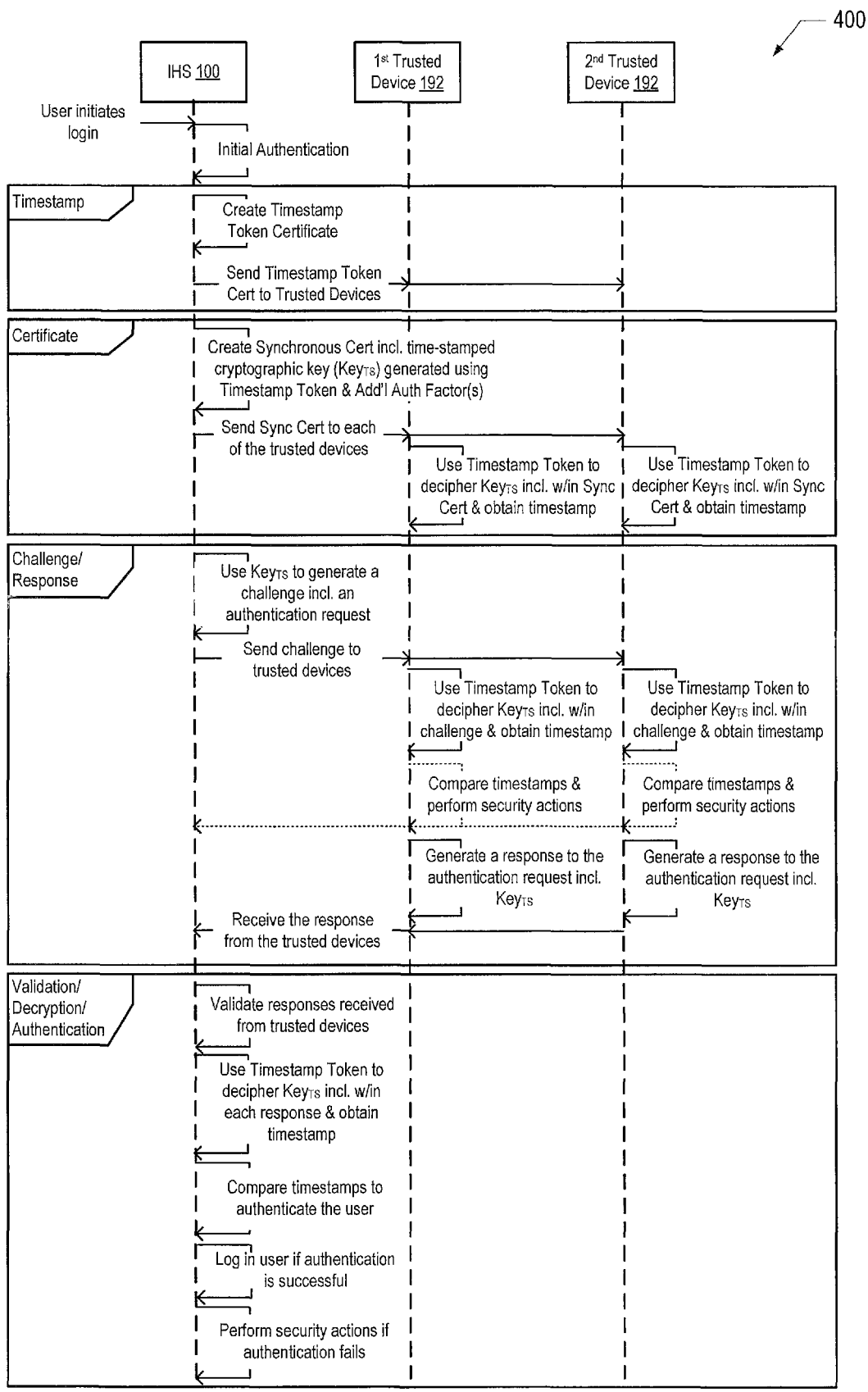
FIG. 4 is process flow diagram illustrating one embodiment of a method, which uses the multi-factor authentication techniques described herein to authenticate a user.
Figure 5:
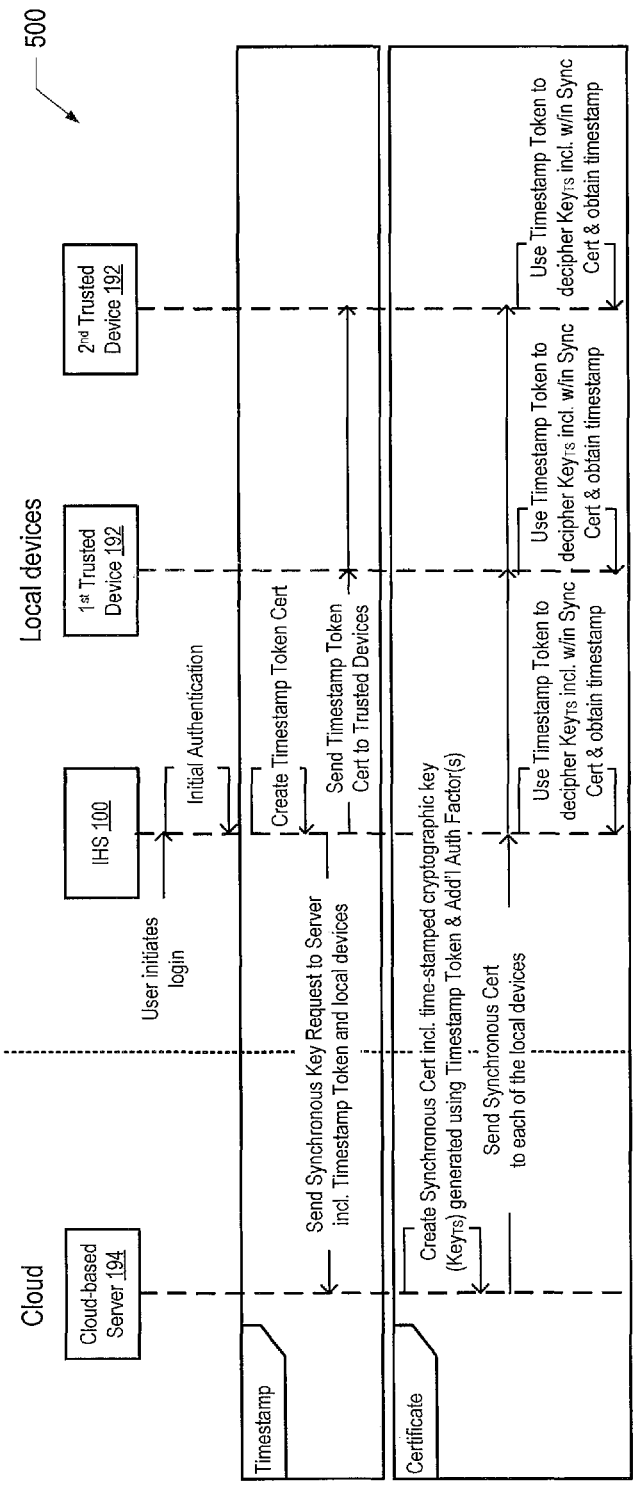
FIG. 5 is process flow diagram illustrating another embodiment of a method, which uses the multi-factor authentication techniques described herein to authenticate a user.
Figure 5:
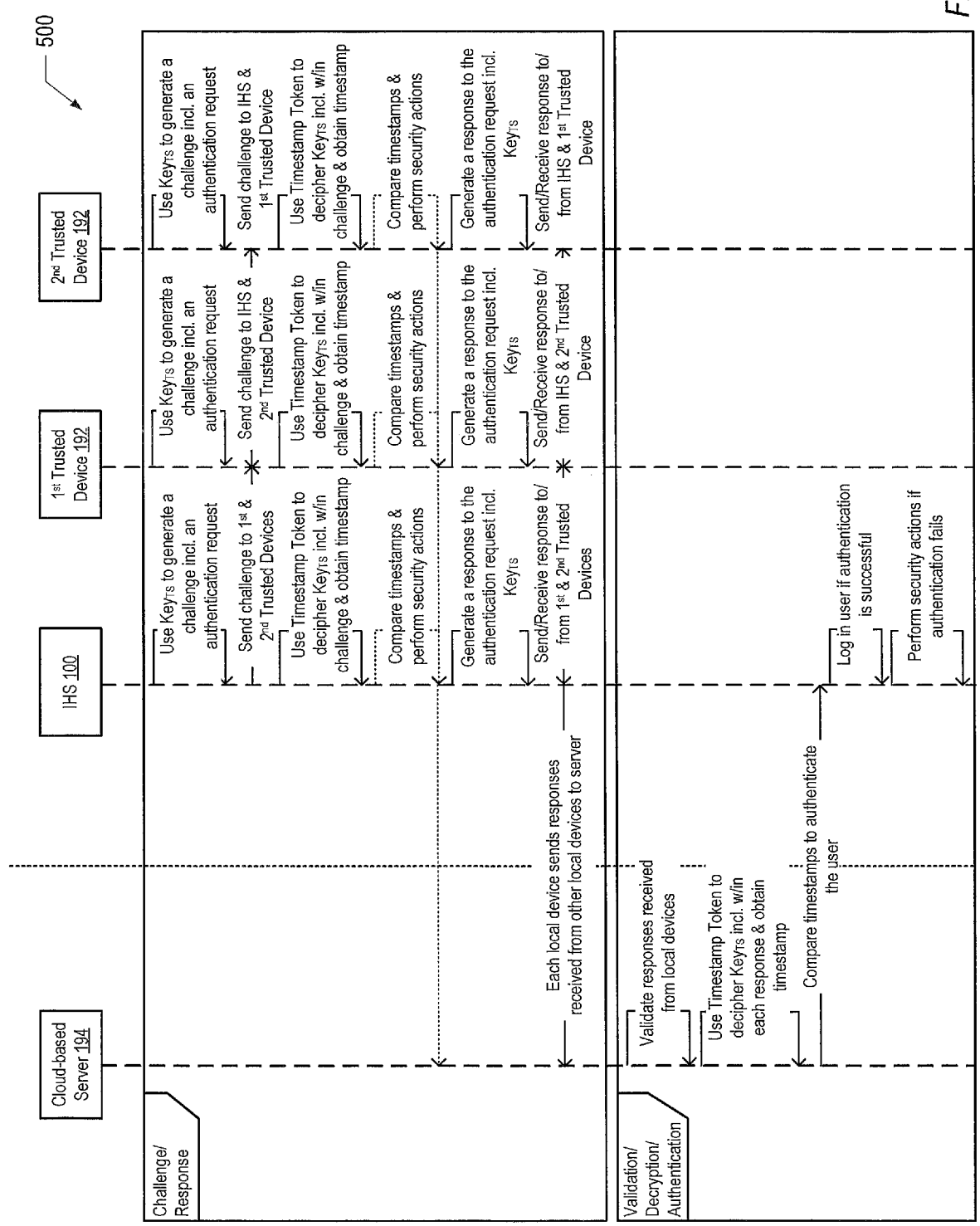

In the embodiment shown in FIG. 1, computer readable storage device 170 is further configured to store user authentication program code 174. User authentication program code 174 may be an OS-based application or OS kernel, which may be executed by the host processor 110 to perform one or more steps of the multi-factor authentication method described herein. Example steps performed via execution of user authentication program code 174 are shown in FIGS. 4 and 5 and described in more detail below.

NIC 180 enables the IHS 100 to communicate with one or more remotely located systems and trusted devices via one or more external networks 190 using one or more communication protocols. Network(s) 190 may comprise a wide area network (WAN), local area network (LAN), personal area network (PAN), or the like, and the connection to and/or between IHS 100 and network(s) 190 may be wired, wireless or a combination thereof. Although network(s) 190 is/are indicated as a single collective component for simplicity, it is appreciated that network(s) 190 may generally comprise one or more networks. In some embodiments, IHS 100 may utilize NIC 180 to access one or more trusted devices 192, which are communicatively coupled to the IHS 100 via a local network 190, such as a LAN or PAN. In some embodiments, IHS 100 may further utilize NIC 180 to access a cloud-based server 194, which is communicatively coupled to the IHS 100 via a wide area network 190, such as the Internet.

As noted above, conventional user authentication methods either provide ease of use at the detriment of security, or provide secure multi-factor authentication at the expense of user convenience. To improve both security and convenience, the present disclosure provides various embodiments of improved systems and methods for authenticating a user. More specifically, the present disclosure provides an improved multi-factor authentication method, which uses trusted secondary devices or peripherals (i.e., "trusted devices") to provide additional authentication factor(s) for verifying user presence/identity after an initial authentication factor has been used to verify user presence/identity. Unlike conventional multi-factor authentication methods, the additional authentication factor(s) provided by the trusted devices do not require user input or intervention.

As noted above and described in more detail below, the multi-factor authentication methods disclosed herein use an automated challenge-response to provide the additional authentication factor(s) needed to verify user presence/identity. Unlike conventional multi-factor authentication methods, the challenge-response is generated and communicated synchronously between an IHS (such as IHS 100) and one or more trusted devices (such as trusted devices 192) without user input or intervention (e.g., the disclosed challenge-response does not require a user to enter a one-time pass code or access an authentication application to approve/deny an authentication request). This enables the multi-factor authentication methods disclosed herein to perform multiple factors of authentication in significantly less time (e.g., within 1 second or less) than is typically required in conventional multi-factor authentication methods that utilize a challenge-response mechanism (e.g., 1-30 minutes). By reducing the authentication time needed to verify user presence/identity, the multi-factor authentication methods disclosed herein significantly reduce the risk of security threats.

Figure 2:
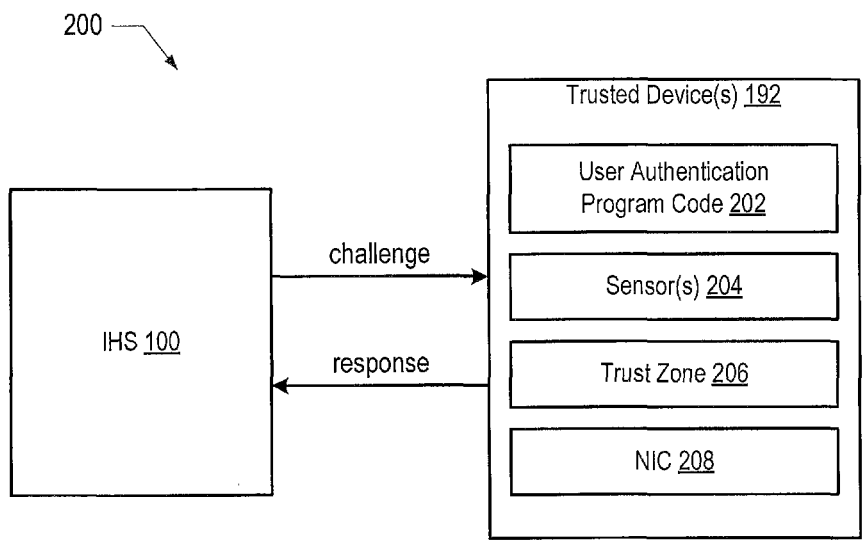
FIG. 2 is a block diagram illustrating one embodiment of a system that utilizes the multi-factor authentication techniques described herein.
Figure 3:
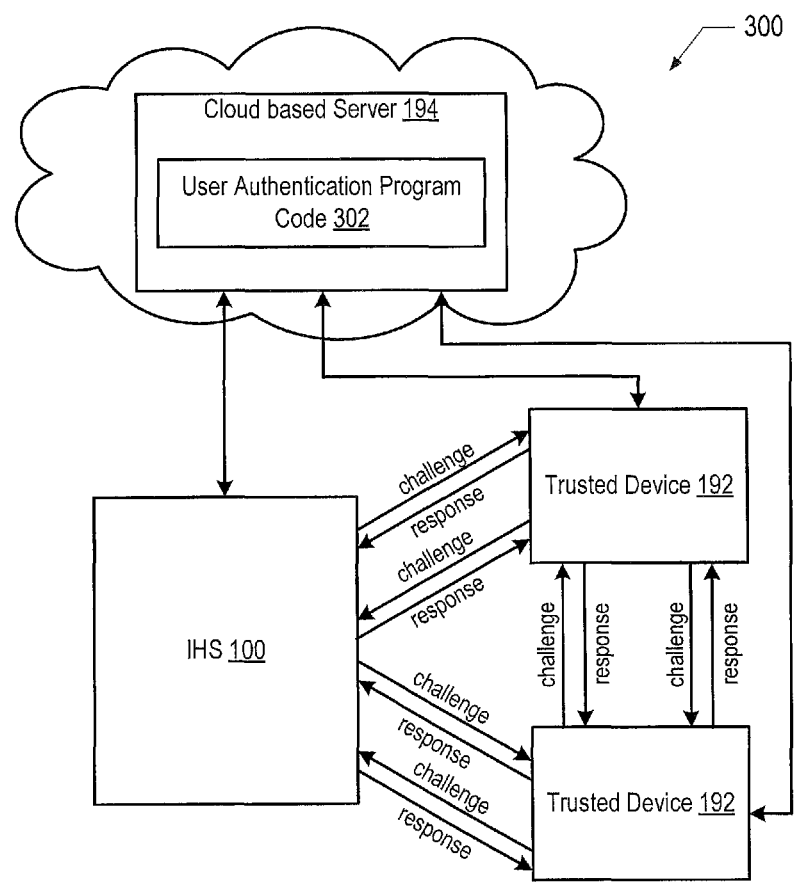
FIG. 3 is a block diagram illustrating another embodiment of a system that utilizes the multi-factor authentication techniques described herein.

The improved systems and methods disclosed herein for authenticating a user may be implemented in a variety of different ways. In some embodiments, an IHS and one or more trusted devices may perform all steps of the multi-factor authentication methods described herein to locally authenticate a user. As described in more detail below, the IHS and trusted device(s) may be located in close physical proximity to each other, and may be communicatively coupled to one or more local networks, such as a LAN and/or PAN. As such, the IHS and trusted device(s) may be referred to as "local devices." FIGS. 2 and 4 illustrate example embodiments of an improved system 200 and multi-factor authentication method 400, which utilizes a plurality of local devices 100/192 to authenticate a user. In other embodiments, one or more steps of the multi-factor authentication methods described herein may be performed by a cloud-based server 194, which is communicatively coupled to the local devices 100/192 via a wide area network (WAN), such as the Internet. FIGS. 3 and 5 illustrate example embodiments of an improved system 300 and multi-factor authentication method 500, which utilizes both local devices 100/192 and a cloud-based server 194 to authenticate a user.

FIG. 2 illustrates one embodiment of an improved system 200 that utilizes a plurality of local devices to locally authenticate a user. In the embodiment shown in FIG. 2, the improved system 200 includes IHS 100 and one or more trusted devices 192, which are located in close proximity to IHS 100 and communicatively coupled via a local network, such as the network 190 shown in FIG. 1. Generally speaking, IHS 100 may be a desktop computer, a laptop computer, a tablet computer, a smart phone or any other computer system or device through which a user may initiate login to a protected resource by providing user login information to the IHS 100. Examples of user login information that may be provided to IHS 100 include, but are not limited to, a username and password, a personal identification number (PIN), a security token, a security badge or wristband, and a biometric identifier, such as a fingerprint, retinal scan, facial recognition, voice signature, etc. As noted above, the user login information provided to the IHS 100 to initiate login is an initial authentication factor, which is used to verify user presence/identity.

In some embodiments, the IHS 100 shown in FIG. 2 may be configured similar to the IHS 100 shown in FIG. 1 and described above. For example, the IHS 100 shown in FIG. 2 may include one or more I/O devices 156 through which a user may provide user login information to the IHS, a computer readable storage device 170 for storing user authentication program code 174, and a host processor 110 for executing the user authentication program code 174 once the initial authentication is successful to perform one or more steps of the multi-factor authentication method shown and described herein. The IHS 100 shown in FIG. 2 may also include other hardware and software components, as set forth above. For example, the IHS 100 shown in FIG. 2 may include a plurality of sensors 155, a trust zone (TZ) 154 and a NIC 180, as shown in FIG. 1.

As noted above, sensors 155 obtain sensor data. In some embodiments, the sensor data obtained by the sensors 155 may be used to detect user presence/identity. In other embodiments, the sensor data obtained by the sensors 155 may include biometric data, which can be processed and used as user login information.

Trust zone 154 provides secure storage of security tokens and cryptographic keys, and also provides the cryptographic functionality needed to encrypt/decrypt cryptographic keys. In some embodiments, trust zone 154 may be used to store a timestamp token, which was generated by the IHS 100 when the user initiated login to capture a timestamp of the user login time. In some embodiments, user authentication program code 174 may utilize the cryptographic functionality provided by trust zone 154 and the timestamp token stored therein to: (a) encrypt a time-stamped cryptographic key included within a challenge communicated from the IHS 100 to the trusted device(s) 192, and (b) decrypt a time-stamped cryptographic key included within a corresponding response communicated from the trusted device(s) 192 back to the IHS 100.

NIC 180 enables IHS 100 to communicate with the trusted device(s) 192 over one or more local networks (e.g., a LAN and/or PAN) using one or more communication protocols. Examples of communication protocols include, but are not limited to, Bluetooth, Bluetooth Low Energy (BLE), Zigbee, NFC, Wi-Fi, cellular, etc.

After the user initiates login and the user login information is used as an initial authentication factor to successfully verify user presence/identity, the user authentication program code 174 stored within computer readable storage device 170 is executed by host processor 110 to send an automated challenge from the IHS 100 to one or more trusted devices 192. If more than one trusted device 192 is used, the automated challenge is communicated synchronously to all trusted device(s) 192 within the local network. As noted above, the automated challenge communicated from the IHS 100 to the trusted device(s) 192 may include, and/or be encrypted with, a time-stamped cryptographic key.

Upon receiving the challenge, each trusted device 192 generates a response, which is communicated back to the IHS 100 for validation, decryption and authentication in the embodiment shown in FIG. 2. Like the automated challenge, the response communicated from the trusted device(s) 192 to the IHS 100 may also include, and/or be encrypted with, a time-stamped cryptographic key.

A variety of trusted devices 192 may be used to provide an automated response when challenged by IHS 100. In some embodiments, trusted device(s) 192 may include a laptop computer, a tablet computer, and/or a security camera. In other embodiments, trusted device(s) 192 may additionally or alternatively include one or more "smart"

devices. As known in the art, a smart device is an electronic device, generally connected to other devices or networks via one or more wireless communication protocols (e.g., Bluetooth, BLE, Zigbee, NFC, Wi-Fi, cellular, etc.) that can operate to some extent interactively and autonomously. A smart device may also include one or more sensors for collecting various forms of sensor data. Examples of smart devices include, but are not limited to, a smart docking station, a smart monitor, a smart phone, a smart watch, a smart band, a smart home assistant (e.g., Amazon Alexa, Google Home, etc.), a smart doorbell, a smart tv, a smart home appliance, a smart home automation device, etc.

The trusted device(s) 192 may include many of the same components included within the IHS 100. For example, each of the trusted device(s) 192 may include user authentication program code 202, which is stored within a computer readable medium and executed by a processing device of the trusted device to perform one or more steps of the multi-factor authentication method described herein. In addition, the trusted device(s) 192 may include one or more sensors 204, a trust zone 206 and a NIC (or wireless transceiver) 208, as shown in FIG. 2.

The sensor(s) 204 included within the trusted device(s) 192 obtain sensor data, which can be used to generate and/or communicate a response back to the IHS 100. A variety of sensors 204 and/or devices may be included for such purpose. Examples of sensors 204 and/or devices that may be included within the trusted device(s) 192 for generating and/or communicating a response include, but are not limited to, optical sensors/devices (e.g., a camera, infrared (IR) sensor, etc.), acoustic sensors/devices (e.g., a microphone, speaker, etc.), motion/direction sensors (e.g., an accelerometer, gyroscope, etc.), display devices, Light Detection and Ranging (LIDAR) devices, barometric devices, biometric devices, etc. The particular sensors 204 used to generate the response may generally depend on the IHS 100, the trusted device(s) 192 and the nature of the challenge communicated there between.

For example, an information handling system (e.g., a desktop computer, laptop computer, etc.) may communicate a challenge containing a visual representation of a time-stamped cryptographic key (e.g., a timestamped QR code) to one or more trusted devices (e.g., a security camera, a smart phone, etc.) by displaying the time-stamped cryptographic key on a display screen of the IHS. In response to receiving the visually depicted challenge, the trusted device(s) may use one or more optical sensors/devices (e.g., one or more cameras) to obtain images of the user (or a portion of the user, such as the user's face) and images the time-stamped cryptographic key displayed on the IHS display screen. The images obtained by the trusted device(s) may then be used to generate a response, which is communicated back to the IHS for validation, decryption and authentication.

In another example, an information handling system (e.g., a desktop computer, laptop computer, etc.) may communicate a challenge containing an audio representation of a time-stamped cryptographic key to one or more trusted devices (e.g., a smart phone, a smart home assistant, and other smart devices having audio capabilities) by transmitting a radio frequency (RF) signal encoded with the time-stamped cryptographic key. In response to receiving the audio-encoded challenge, the trusted device(s) may use one or more audio sensors/devices (e.g., a microphone, speaker, acoustic sensor, etc.) to receive and relay a corresponding audio-encoded response back to the IHS for validation, decryption and authentication.

In yet another example, an information handling system (e.g., a desktop computer, laptop computer, etc.) may communicate a challenge containing a time-stamped cryptographic key to one or more trusted devices (e.g., a smart phone, a smart home assistant, and other smart devices). In response to receiving the challenge, the trusted device(s) may use one or more sensors included within the trusted device(s) to receive and relay a corresponding response back to the IHS for validation, decryption and authentication. Additional software and/or artificial intelligence may also be utilized within the trusted device to generate the response. For example, a smart phone may use a camera and facial recognition software to generate a response that may be relayed back to the IHS. In another example, a home assistant device equipped with artificial intelligence (such as Amazon Alexa, etc.) may use a microphone and acoustic sensor to capture the user's voice or footsteps, artificial intelligence (AI) or machine learning (ML) to recognize the user's voice or footsteps, and a speaker to relay a response back to the IHS.

Trust zone 206 provides secure storage of security tokens and cryptographic keys, and also provides the cryptographic functionality needed to encrypt/decrypt cryptographic keys. In some embodiments, trust zone 206 may store a timestamp token, which was generated by the IHS 100 to capture a timestamp of the user login time and sent by the IHS 100 to the trusted device(s) 192. In some embodiments, user authentication program code 202 may utilize the cryptographic functionality provided by trust zone 206 and the timestamp token stored therein to: (a) decrypt the time-stamped cryptographic key included within the challenge communicated from the IHS 100 to the trusted device(s) 192, and (b) encrypt the time-stamped cryptographic key included within the response communicated from the trusted device(s) 192 back to the IHS 100.

NIC 208 enables the trusted device(s) 192 to communicate with IHS 100 over one or more local networks (e.g., a LAN and/or PAN) using one or more communication protocols. As noted above, examples of communication protocols include, but are not limited to, Bluetooth, BLE, Zigbee, NFC, Wi-Fi, cellular, etc.

FIG. 4 is process flow diagram illustrating one embodiment of a multi-factor authentication method 400 that uses the techniques described herein to authenticate a user. More specifically, the multi-factor authentication method 400 shown in FIG. 4 uses a plurality of local devices to locally authenticate a user requesting access to a protected resource. In the illustrated embodiment, the plurality of local devices include IHS 100, a first trusted device 192 and a second trusted device 192. The IHS 100 and trusted devices 192 may generally be configured as shown in FIGS. 1-2 and discussed above. Although two trusted devices 192 are shown in FIG. 4, the multi-factor authentication method 400 is not strictly limited to such a number, and may also be performed with a lesser (e.g., 1) or greater (e.g., 3 or more) number of trusted devices.

Multi-factor authentication method 400 is a computer implemented method performed, at least in part, via execution of program instructions (e.g., user authentication program code 174 and 202) stored within IHS 100 and trusted devices 192. Unlike conventional multi-factor authentication methods, the computer implemented method 400 shown in FIG. 4 improves the way in which an information handling system functions, in one respect, by communicating an automated challenge-response between the IHS 100 and the trusted devices 192 after an initial authentication factor has been used to verify user presence/identity. The automated challenge-response provides additional authentication factor(s), which may be used to verify user presence/identity without user input or intervention. In doing so, the computer implemented method 400 improves both security and user convenience, while significantly reducing the authentication time (i.e., the time required to authenticate the user).

As shown in FIG. 4, method 400 begins when a user initiates login to a protected resource by supplying user login information to IHS 100, which is used to provide an initial authentication factor for verifying user presence/identity. If the initial authentication is successful (e.g., if the user login information provided by the user matches stored credentials), IHS 100 creates and sends a timestamp token certificate to the trusted devices 192. The timestamp token certificate may generally include a timestamp token, which was generated by IHS 100 when the user initiated login to capture a timestamp of the login time. In some embodiments, the timestamp token and/or the timestamp token certificate may be securely stored within the IHS 100 and also within the trusted devices 192. For example, the timestamp token and/or the timestamp token certificate may be stored within the trust zone 154 shown in FIG. 1 and the trust zone 206 shown in FIG. 2.

After the timestamp token certificate is created and sent, IHS 100 creates and sends a synchronous certificate to the trusted devices 192, as shown in FIG. 4. The synchronous certificate includes a time-stamped cryptographic key ($Key_{TS}$), which was generated by the IHS 100 using the timestamp token stored therein. For example, the IHS 100 may generate the time-stamped cryptographic key ($Key_{TS}$) by using the timestamp of the login time as a seed to derive a cryptographic function, which is used to generate a passcode. The passcode may include substantially any number of digits. However, the passcode code preferably includes a large number of digits (e.g., greater than 10 digits) to improve the cryptographic strength of the generated passcode. Any of a wide variety of cryptographic functions and/or algorithms can be used to generate the time-stamped cryptographic key, as is known in the art. By using the timestamp of the login time as a seed, IHS 100 generates a unique, time-stamped cryptographic key that is not easily spoofed.

The synchronous certificate generated by IHS 100 may also specify additional authentication factor(s), which may be used to verify user presence/identity. A wide variety of authentication factors may be used, including but not limited to, voice recognition, footsteps, facial recognition, and other biometric feedback/security devices and inherence factors. Other types of authentication factors may also be used. Examples of other authentication factors include, but are not limited to, a radio frequency encoded signal or a unique identification number corresponding to the trusted devices 192 (e.g., a media access control (MAC) address or Internet Protocol (IP) address), which is communicated between the IHS 100 and the trusted devices 192 to verify user presence/identity.

Barometric pressure and Light Detection and Ranging (LIDAR) techniques are additional example of authentication factors that may be used to verify user presence/identity. For example, when measuring barometric pressure in an environment on two separate devices, changes in barometric pressure (e.g., when a door closes in the house) would show equally on the two separate devices, as long as the two separate devices are located within the same environment. If one device leaves the environment (e.g., a user carrying his/her smart phone leaves the environment), the two separate devices may measure different barometric pressures (or changes in pressure), which may indicate user absence. LIDAR techniques, on the other hand, may be used to measure distance by illuminating a target (e.g., the user) with laser light and measuring the reflection of the light with a sensor. Differences in laser return times and wavelengths can then be used to make digital 3-D representations of the target.

The synchronous certificate generated by IHS 100 is communicated synchronously to each of the trusted devices 192. Upon receipt, the trusted devices 192 may validate the synchronous certificate to decipher the time-stamped cryptographic key ($Key_{TS}$) contained therein. For example, the trusted devices 192 may use the timestamp token, which was previously sent to and stored within the trusted devices, to decrypt the time-stamped cryptographic key ($Key_{TS}$) included within the synchronous certificate and obtain the timestamp of the login time.

After the synchronous certificate is created and sent, IHS 100 uses the timestamped cryptographic key ($Key_{TS}$) generated by the IHS to generate and send a challenge to the trusted devices 192, as shown in FIG. 4. The challenge sent from the IHS 100 to the trusted devices 192 includes an authentication request to perform the additional authentication factor(s) specified in the synchronous certificate. In some embodiments, the challenge may also include the time-stamped cryptographic key ($Key_{TS}$), which was previously generated by the IHS 100 using the timestamp token. In other embodiments, the challenge may be encrypted with the time-stamped cryptographic key ($Key_{TS}$) to add an additional layer of security.

The authentication request is a request to collect/access/use the sensor data obtained by one or more sensors included within the trusted devices 192. As noted above, a variety of sensors 204 and/or devices may be included within the trusted devices 192 for obtaining sensor data, such as but not limited to, optical sensors/devices (e.g., a camera, infrared (IR) sensor, etc.), acoustic sensors/devices (e.g., a microphone, speaker, etc.), motion/direction sensors (e.g., an accelerometer, gyroscope, etc.), display devices, LIDAR devices, barometric devices, biometric devices, etc. Examples of sensor data that may be obtained by the sensors include, but are not limited to, audio signals (e.g., voice signatures, voice commands, footstep data, radio frequency signals, etc.), video signals (e.g., a live video feed or recording), optical signals, electrical signals and other sensor data.

The challenge generated by the IHS 100 is communicated synchronously to each of the trusted devices 192. Upon receiving the challenge, the trusted devices 192 use the timestamp token stored therein to decipher the time-stamped cryptographic key ($Key_{TS}$) contained within the challenge and obtain the timestamp of the login time. In some embodiments, the trusted devices 192 may compare the timestamp communicated within the challenge with the timestamp previously communicated within the synchronous certificate to determine if a match exists.

In some embodiments, the trusted devices 192 and/or the IHS 100 may perform one or more actions, if the timestamps do not match. For example, the trusted devices 192 may send a timeout to the IHS 100, which may prompt the IHS to perform one or more security actions if the timestamps do not match. Examples of security actions that may be performed by the IHS 100 include, but are not limited to, preventing the user from logging in, asking the user to re-attempt login, and flagging the login attempt as abnormal user behavior and/or a security threat. Other security actions may also be taken. In another example, the trusted devices 192 may communicate a message back to the IHS 100 requesting another challenge be sent, if the timestamps do not match.

If the timestamps match, each of the trusted devices 192 may generate and send a response to the authentication request back to the IHS 100. As noted above, each trusted device 192 may use the sensor data obtained from the one or more sensors contained therein, and the timestamp token stored within the trusted devices 192, to generate their own timestamped cryptographic key ($Key_{TS}$). In some embodiments, each trusted device 192 may include the timestamped cryptographic key ($Key_{TS}$) generated by that device within the response sent back to the IHS 100. In other embodiments, each trusted device 192 may use the timestamped cryptographic key ($Key_{TS}$) generated by that device to encrypt the sensor data obtained from the sensor(s) contained therein, and may send the encrypted sensor data back to the IHS 100 in the response to the authentication request.

As shown in FIG. 4, the responses generated by the trusted devices 192 are communicated synchronously back to the IHS 100 for validation, decryption and authentication. The IHS 100 validates each response and uses the timestamp token stored within the IHS 100 to decipher the timestamped cryptographic key ($Key_{TS}$) contained within the response and obtain the timestamp of the login time. Next, the IHS 100 may attempt to authenticate the user by comparing the timestamps obtained from each response. If the timestamps are substantially the same (i.e., if the timestamps match), the IHS 100 may authenticate the user and log the user into the protected resource. On the other hand, the IHS 100 may perform one or more security actions, if authentication fails (i.e., if the timestamps obtained from the responses do not match). Examples of security actions that may be performed by the IHS 100 include, but are not limited to, preventing the user from logging in, asking the user to re-attempt login, and flagging the login attempt as abnormal user behavior and/or a security threat. Other security actions may also be taken.

As noted above, FIGS. 2 and 4 illustrate example embodiments of an improved system 200 and multi-factor authentication method 400, which use a plurality of local devices 100/192 to authenticate a user. In the embodiments shown in FIGS. 2 and 4 and described above, the IHS 100 and trusted devices 192 perform all steps of multi-factor authentication method 400 to locally authenticate a user. However, the multi-factor authentication methods described herein are not strictly limited to local authentication. In other embodiments, one or more steps of the multi-factor authentication methods described herein may be performed by a cloud-based server 194, which is communicatively coupled to the local devices 100/192 via a wide area network (WAN), such as the Internet.

FIGS. 3 and 5 illustrate example embodiments of an improved system 300 and multi-factor authentication method 500, which use a plurality of local devices 100/192 and a cloud-based server 194 to authenticate a user. Like the system 200 shown in FIG. 2, the IHS 100 and trusted devices 192 shown in FIG. 3 are "local devices," which are located in close proximity to each other and communicatively coupled via a local network, such as a LAN and/or PAN. The IHS 100 and trusted devices 192 may be generally configured as shown in FIGS. 1-2 and described above.

The cloud-based server 194 shown in FIGS. 3 and 5 is a remote device, which is communicatively coupled to the local devices 100/192 via a wide area network, such as the Internet. Like IHS 100 and trusted devices 192, the cloud-based server 194 shown in FIG. 3 may generally include a computer readable storage device for storing user authentication program code 302, and a host processor for executing the user authentication program code 302 to perform one or more steps of the multi-factor authentication method shown and described herein. The cloud-based server 194 may also include other hardware and software components, as is known in the art.

The system 300 shown in FIG. 3 differs from the system 200 shown in FIG. 2 in a variety of ways. In system 200, for example, an automated challenge is synchronously communicated from IHS 100 to each of the trusted devices 192, which generate and communicate a response back to the IHS 100 for validation, decryption and authentication. In system 300, each local device 100/192 generates and communicates a challenge to the other local devices 100/192 and receives a corresponding response in return. The responses generated by the local devices 100/192 are subsequently sent to the cloud-based server 194 for validation, decryption and authentication. Additional details are discussed in more detail below with reference to FIG. 5.

FIG. 5 is process flow diagram illustrating one embodiment of a multi-factor authentication method 500 that uses the techniques described herein to authenticate a user. More specifically, the multi-factor authentication method 500 shown in FIG. 5 uses a plurality of local devices 100/192 and a cloud-based authentication server 194 to authenticate a user requesting access to a protected resource. Like the previous embodiment, the plurality of local devices shown in FIG. 5 include IHS 100, a first trusted device 192 and a second trusted device 192. Although two trusted devices 192 are shown in FIG. 5, the multi-factor authentication method 500 is not strictly limited to such a number, and may also be performed with a lesser (e.g., 1) or greater (e.g., 3 or more) number of trusted devices.

Multi-factor authentication method 500 is a computer implemented method performed, at least in part, via execution of program instructions (e.g., user authentication program code 174, 202 and 302) stored within the IHS 100, the trusted devices 192 and the cloud-based authentication server 194. Unlike conventional multi-factor authentication methods, the computer implemented method 500 shown in FIG. 5 improves the way in which an information handling system functions, in one respect, by communicating an automated challenge-response between the IHS 100 and the trusted devices 192 after an initial authentication factor has been used to verify user presence/identity. The automated challenge-response provides additional authentication factor(s), which may be used to verify user presence/identity without user input or intervention. In doing so, computer implemented method 500 improves both security and user convenience, while significantly reducing the authentication time (i.e., the time required to authenticate the user).

As shown in FIG. 5, method 500 begins when a user initiates login to a protected resource by supplying user login information to IHS 100, which is used to provide an initial authentication factor for verifying user presence/identity. If the initial authentication is successful (e.g., if the user login information provided by the user matches stored credentials), IHS 100 creates and sends a timestamp token certificate to the trusted devices 192. As noted above, the timestamp token certificate includes a timestamp token, which was generated by IHS 100 when the user initiated login to capture a timestamp of the login time. The timestamp token and/or the timestamp token certificate is securely stored within the IHS 100 and the trusted devices 192, as set forth above.

In the multi-factor authentication method 500 shown in FIG. 5, the IHS 100 sends a synchronous key request to the cloud-based server 194, requesting the cloud-based server 194 to generate a synchronous certificate. The synchronous key request may also include the timestamp token generated by the IHS 100 and a list of the local devices 100/192. Upon receiving the synchronous key request, the cloud-based server 194 generates a synchronous certificate, including a time-stamped cryptographic key (Key$_{TS}$) and one or more additional authentication factors, as set forth above.

The synchronous certificate generated by the cloud-based server 194 is communicated synchronously to each of the local devices 100/192. Upon receipt, the local devices 100/192 may validate the synchronous certificate to decipher the time-stamped cryptographic key (Key$_{TS}$) contained therein. For example, each local device 100/192 may use the timestamp token stored therein to decrypt the time-stamped cryptographic key (Key$_{TS}$) included within the synchronous certificate and obtain the timestamp of the login time.

In the multi-factor authentication method 500 shown in FIG. 5, each local device 100/192 uses the timestamped cryptographic key (Key$_{TS}$) included within the synchronous certificate to generate and send a challenge to the other local devices 100/192. Alternatively, each local device 100/192 may use the timestamp token stored therein to generate it's own timestamped cryptographic key (Key$_{TS}$), which is then used to generate and send a challenge to the other local devices 100/192. As shown in FIG. 5, IHS 100 may generate and send a challenge to the first and second trusted devices 192, the first trusted device 192 may generate and send a challenge to the IHS 100 and the second trusted device 192, and the second trusted device 192 may generate and send a challenge to the IHS 100 and the first trusted device 192.

Each challenge includes an authentication request to perform the additional authentication factor(s) specified in the synchronous certificate. As noted above, the authentication request may be a request to collect/access/use the sensor data obtained by one or more sensors included within the local devices 100/192. In some embodiments, the challenge may also include the time-stamped cryptographic key (Key$_{TS}$), which was generated by the cloud-based server 194 or the local device 100/192 using the timestamp token generated by the IHS 100. In other embodiments, the challenge may be encrypted with the time-stamped cryptographic key (Key$_{TS}$) to add an additional layer of security.

The challenge generated by each local device 100/192 is communicated synchronously to the other local devices 100/192. Upon receiving each challenge, the local devices 100/192 use the timestamp token stored therein to decipher the time-stamped cryptographic key (Key$_{TS}$) contained within the challenge and obtain the timestamp of the login time. In some embodiments, the local devices 100/192 may compare the timestamp communicated within the challenge with the timestamp previously communicated within the synchronous certificate to determine if a match exists. If the timestamps do not match, the trusted devices 192 and/or the IHS 100 may perform one or more actions, as set forth above.

In the multi-factor authentication method 500 shown in FIG. 5, each local device 100/192 generates and sends a response to the authentication request back to the other local devices 100/192. For example, IHS 100 may generate and send a response to the first and second trusted devices 192, the first trusted device 192 may generate and send a response to the IHS 100 and the second trusted device 192, and the second trusted device 192 may generate and send a response to the IHS 100 and the first trusted device 192.

As noted above, the local devices 100/192 may use the sensor data obtained from the one or more sensors and the timestamp token stored within the local devices to generate their own timestamped cryptographic key (Key$_{TS}$). In some embodiments, the response sent from each local device 100/192 to the other local devices 100/192 may include the timestamped cryptographic key (Key$_{TS}$) generated by that trusted device. In other embodiments, each local device 100/192 may use its own timestamped cryptographic key (Key$_{TS}$) to encrypt the sensor data obtained from the sensor(s) contained within that device, and may send the encrypted sensor data to the other local devices 100/192 in the response.

In the multi-factor authentication method 500 shown in FIG. 5, each local device 100/192 sends the responses received from the other local devices 100/192 to the cloud-based server 194 for validation, decryption and authentication. In other embodiments, the responses generated by each local device 100/192 may be sent directly to the cloud-based server 194.

The cloud-based server 194 validates each response received from the local devices 100/192, and uses the timestamp token stored within the cloud-based server 194 to decipher the time-stamped cryptographic key (Key$_{TS}$) contained within the response and obtain the timestamp of the login time. Next, the cloud-based server 194 may attempt to authenticate the user by comparing the timestamps obtained from each response. If the timestamps are substantially the same (i.e., if the timestamps match), the cloud-based server 194 may authenticate the user and notify the IHS 100 that authentication was successful. If authentication is successful, the IHS 100 may log the user in and/or grant access to the protected resource.

If the timestamps differ (i.e., if the timestamps obtained from the responses do not match), the cloud-based server 194 may notify the IHS 100 that authentication failed. In some embodiments, the IHS 100 may perform one or more security actions, if authentication fails. Examples of security actions that may be performed by the IHS 100 include, but are not limited to, preventing the user from logging in, asking the user to re-attempt login, and flagging the login attempt as abnormal user behavior and/or a security threat. Other security actions may also be taken.

In some embodiments, the multi-factor authentication methods 400/500 shown in FIGS. 4-5 may be used to authenticate a user when the user initiates login to a protected resource, such as a protected IHS, network, website, application, etc. However, the multi-factor authentication methods disclosed herein are not strictly limited to such use, and may be used for other purposes. In some embodiments, the multi-factor authentication methods disclosed herein may be used to continually authenticate, or periodically reauthenticate, a user that has already logged in and been granted access to the protected resource. In other embodiments, the disclosed multi-factor authentication methods may be used to continually validate or authenticate a user for on-line testing (i.e., continuous proctoring) and/or for other sensitive information handling purposes.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, Internet of Things (IoT) device, or any other suitable device and may vary in size, shape, performance, functionality, and price. The information handling system may generally include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented, for example, as firmware or as a computer program of instructions, which are embodied in a non-transitory tangible computer readable medium and executed by one or more processing devices included within an information handling system (IHS), a trusted device and/or cloud-based server, as described herein. The computer program of instructions may generally include an ordered listing of executable instructions for implementing logical functions within the IHS, the trusted device(s), the cloud-based server or within a component thereof. The executable instructions may include a plurality of code segments operable to instruct components of the IHS, the trusted device(s) and/or the cloud-based server to perform the methodologies disclosed herein. It will also be understood that one or more steps of the present methodologies may be employed in one or more code segments of a computer program. For example, a code segment executed by the IHS, the trusted device(s) and/or the cloud-based server may include one or more steps of the disclosed methodologies.

It will be understood that the one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random access memories, read only memories, programmable memory devices, reprogrammable storage devices, hard drives, floppy disks, DVDs, CD-ROMs, and/or any other tangible data storage mediums.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A system for securely authenticating a user, the system comprising:
    an information handling system (IHS) coupled to receive user login information from the user when the user initiates login to a protected resource, wherein the user login information is used as an initial authentication factor to verify a presence or identity of the user; and
    at least one trusted device communicatively coupled to the IHS via a local network, wherein the at least one trusted device includes one or more sensors for obtaining sensor data;
    wherein if the initial authentication factor successfully verifies the presence or identity of the user, the IHS generates and communicates a challenge to the at least one trusted device, which uses the sensor data obtained by the one or more sensors to generate and communicate a response; and
    wherein the challenge and the response provide an additional authentication factor, which is used to further verify the presence or identity of the user without user input or intervention.

2. The system as recited in claim 1, wherein the at least one trusted device comprises a plurality of trusted devices, wherein the challenge generated by the IHS is communicated synchronously to each of the plurality of trusted devices, and wherein the responses generated by the plurality of trusted devices are communicated synchronously back to the IHS or to a cloud-based server.

3. The system as recited in claim 1, wherein the challenge includes an authentication request to collect, access and/or use the sensor data obtained by the one or more sensors included within the at least one trusted device.

4. The system as recited in claim 3, wherein upon receiving the challenge from the IHS, the at least one trusted device uses the sensor data obtained from the one or more sensors included therein to generate and communicate the response to the authentication request.

5. The system as recited in claim 1, wherein the IHS comprises a first set of program instructions stored within a computer-readable medium of the IHS, wherein if the initial authentication factor successfully verifies the presence or identity of the user, the first set of program instructions are executed by a processing device of the IHS to:
    generate a timestamp token to capture a first timestamp of the time the user initiated login to the protected resource;
    store the timestamp token within the IHS;
    send the timestamp token to the at least one trusted device; and
    generate and communicate the challenge to the at least one trusted device, wherein the challenge comprises a first timestamped cryptographic key that is generated by the IHS using the timestamp token.

6. The system as recited in claim 5, wherein the response generated by the at least one trusted device is communicated back to the IHS for validation, decryption and authentication.

7. The system as recited in claim 6, wherein the first set of program instructions are further executed by the processing device of the IHS to:
    validate the response received from the at least one trusted device, wherein the response comprises a second timestamped cryptographic key, which is generated by the at least one trusted device using the timestamp token sent by the IHS to the at least one trusted device;

decrypt the second timestamped cryptographic key using the timestamp token stored within the IHS to obtain a second timestamp;

compare the second timestamp to the first timestamp;

authenticate the user and log the user into the protected resource, if the second timestamp matches the first timestamp; and perform one or more security related actions, if the second timestamp does not match the first timestamp.

8. The system as recited in claim 5, further comprising a cloud-based server communicatively coupled to the IHS and the at least one trusted device via a wide area network, wherein the response generated by the at least one trusted device is communicated back to the cloud-based server for validation, decryption and authentication.

9. The system as recited in claim 8, wherein the cloud-based server comprises a second set of program instructions, which are stored within a computer-readable medium and executed by a processing device of the cloud-based server to:

validate the response received from the at least one trusted device, wherein the response comprises a second timestamped cryptographic key, which is generated by the at least one trusted device using the timestamp token sent by the IHS to the at least one trusted device;

decrypt the second timestamped cryptographic key using the timestamp token stored within the IHS to obtain a second timestamp;

compare the second timestamp to the first timestamp; and authenticate the user only if the second timestamp matches the first timestamp.

10. The system as recited in claim 9, wherein the first set of program instructions are further executed by the processing device of the IHS to:

log the user into the protected resource, if the cloud-based server authenticates the user; and perform one or more security related actions, if the cloud-based server fails to authenticate the user.

11. A computer implemented method performed by an information handling system (IHS) to securely authenticate a user attempting to login to a protected resource, the computer implemented method comprising:

generating a challenge after an initial authentication factor has been used by the IHS to successfully verify a presence or identity of the user, wherein the challenge includes an authentication request to collect, access and/or use sensor data obtained by a plurality of trusted devices communicatively coupled to the IHS;

communicating the challenge synchronously to each of the plurality of trusted devices; and receiving a response to the authentication request from each of the plurality of trusted devices, wherein each trusted device uses sensor data obtained from one or more sensors included within the trusted device to generate the response;

wherein the challenge and the response provide an additional authentication factor, which is used to further verify the presence or identity of the user, and wherein the challenge and the response are generated without user input or intervention.

12. The computer implemented method as recited in claim 11, wherein after an initial authentication factor has been used by the IHS to successfully verify a presence or identity of the user and prior to generating the challenge, the computer implemented method further comprises:

generating a timestamp token to capture a timestamp of the user's login time;

storing the timestamp token within the IHS; and sending the timestamp token to the plurality of trusted devices.

13. The computer implemented method as recited in claim 12, wherein the response received from each trusted device includes, or is encrypted with, a timestamped cryptographic key that was generated by the trusted device using the timestamp token sent from the IHS to the trusted device.

14. The computer implemented method as recited in claim 13, further comprising:

validating the responses received from the plurality of trusted devices;

decrypting the timestamped cryptographic key using the timestamp token stored within the IHS to obtain a timestamp;

comparing the timestamp obtained from the timestamped cryptographic key to the timestamp of the user's login time;

authenticating the user and logging the user into the protected resource, if the timestamp obtained from the timestamped cryptographic key matches the timestamp of the user's login time; and performing one or more security actions, if the timestamp obtained from the timestamped cryptographic key does not match the timestamp of the user's login time.

15. The computer implemented method as recited in claim 14, wherein the one or more security actions comprise: preventing the user from logging in, asking the user to re-attempt login, and/or flagging the login attempt as abnormal user behavior or a security threat.

16. A computer implemented method to securely authenticate a user attempting to login to a protected resource, wherein the computer implemented method is performed by at least one trusted device communicatively coupled to an information handling system (IHS), the computer implemented method comprising:

receiving a timestamp token from the IHS after an initial authentication factor has been used by the IHS to successfully verify a presence or identity of the user, wherein the timestamp token comprises a timestamp of the user's login time;

receiving a challenge from the IHS, wherein the challenge includes: (a) an authentication request to collect, access and/or use sensor data obtained by the at least one trusted device, and (b) a first timestamped cryptographic key that was generated by the IHS using the timestamp token;

using the sensor data obtained by the at least one trusted device and the timestamp token received from the IHS to generate a second timestamped cryptographic key; and sending a response to the authentication request back to the IHS, wherein the response includes, or is encrypted with, the second timestamped cryptographic key.

17. The computer implemented method as recited in claim 16, wherein upon receiving the challenge, the computer implemented method further comprises:

decrypting the first timestamped cryptographic key using the timestamp token received from the IHS to obtain a timestamp; and comparing the timestamp obtained from the first timestamped cryptographic key to the timestamp included within the timestamp token.

18. The computer implemented method as recited in claim 17, wherein said sending a response to the authentication request back to the IHS comprises sending the response to the authentication request back to the IHS only if the timestamp obtained from the first timestamped cryptographic key matches the timestamp included within the timestamp token.

19. The computer implemented method as recited in claim 17, wherein if the timestamp obtained from the first timestamped cryptographic key does not match the timestamp included within the timestamp token, the computer implemented method further comprises:
   sending a timeout to the IHS, wherein the timeout causes the IHS to perform one or more security actions; or
   sending a message back to the IHS requesting another challenge be sent to the at least one trusted device.

20. The computer implemented method as recited in claim 19, wherein the one or more security actions comprise: preventing the user from logging in, asking the user to re-attempt login, and/or flagging the login attempt as abnormal user behavior or a security threat.

\* \* \* \* \*